May 9, 1961 M. M. SEELOFF 2,983,891
DEVICE FOR TRANSFERRING CURRENTS TO ROTARY APPARATUS
Filed Sept. 11, 1958
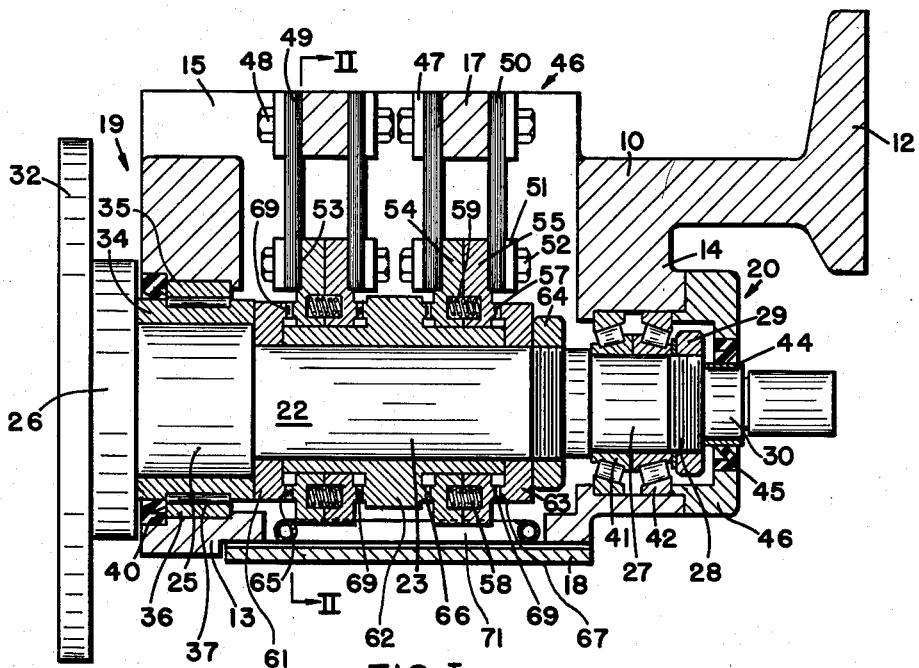
FIG. I
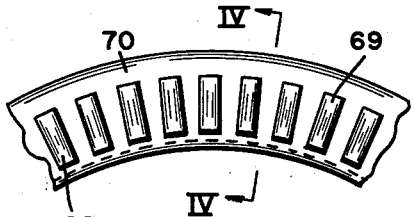
FIG. 3
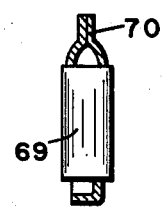
FIG. 4
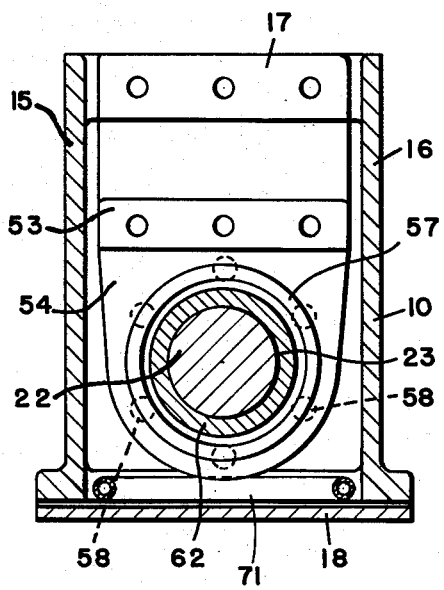
FIG. 2
INVENTOR
MELVIN M. SEELOFF
BY Francis J. Klempay
ATTORNEY

United States Patent Office 2,983,891
Patented May 9, 1961

2,983,891

DEVICE FOR TRANSFERRING CURRENTS TO ROTARY APPARATUS

Melvin M. Seeloff, Warren, Ohio, assignor to The Taylor-Winfield Corporation, Warren, Ohio, a corporation of Ohio Filed Sept. 11, 1958, Ser. No. 760,470

7 Claims. (Cl. 339—5)

The present invention relates generally to apparatus for transferring electrical currents between two relatively movable current conducting members in an improved manner. More particularly, the present invention is directed to the provision of improved apparatus which is specifically adapted for transferring high-amperage welding currents from a stationary contacting member to a rotary electrode of a welding machine.

It is the primary or ultimate object of the present invention to provide a device for transferring heavy resistance welding currents, for example, which is of a highly compact nature, having a simplified overall construction, while being wholly adequate for the purposes intended.

Another object of the present invention is the provision of a rotary current transfer device for heavy duty operations which is characterized by a new and novel arrangement for transferring current from a stationary contacting member to a rotating spindle or rotary electrode. As will be more fully apparent upon consideration of the following specification, the current transfer device of the present invention embodies a plurality of small annular needle thrust bearing rollers which form the actual current collecting and transferring means. By the use of this type of construction the transfer of current is effected in a highly efficient manner with a minimum of electrical losses.

A further object of the invention is to provide current transferring apparatus of the character described which embodies improved means for supporting the rotating spindle or shaft. As will be understood by those skilled in the welding art, the rotary electrode in a resistance welding machine is subjected to considerable mechanical forces in completing a welding operation and the current transferring apparatus must be capable of supporting the rotary electrode against undue deflection, etc. without adversely effecting the efficient current conducting properties of the transferring device. In the present instance the electrode spindle is journaled by bearings at spaced points with the forward-most bearing being a needle bearing and having extremely hard non-conductive races whereby any choking effect on the electrical current flowing through the spindle is completely eliminated.

Yet another object of the invention is to provide a rotary current transfer device wherein the current transfer means is continuously immersed in a bath of lubricant to thus further reduce the friction between the various parts, improve electrical contact between the parts and increase the cooling capacity of the apparatus. In this connection, it is preferred that the bath of lubricant be cooled by suitable coolant conducting means whereby the rate of transfer of heat from the apparatus is substantially increased.

Still another object of the invention is the provision of a device for transferring high-amperage electrical currents to a rotary welding electrode or the like wherein anti-friction means are utilized for rotatably supporting the rotary electrode spindle and for efficient low resistance transfer of electrical current from a stationary contacting member to said rotary welding electrode.

Specifically, the invention seeks to provide apparatus for the purposes indicated of inexpensive and utilitarian construction. The teachings of this invention are intended to provide practical and durable rotary electrical apparatus capable of extensive periods of maintenance-free use under severe operating conditions as will appear. In addition, the apparatus is so designated that the various contacting parts which are subject to wear are self-adjusting and, upon prolonged usage, may be easily replaced in a minimum of time.

The above, as well as other objects and advantages of the invention, will become more fully apparent upon consideration of the following specification and accompanying drawing wherein there is disclosed a preferred illustrated embodiment constructed in accordance with the teachings of the present invention.

In the drawing:

Figure 1 is an axial sectional view of rotary electrode apparatus constructed in accordance with the teachings of the present invention;

Figure 2 is an end sectional view of the apparatus of Figure 1 taken along the section line II—II;

Figure 3 is an enlarged partial front elevational view of an annular ring of current collecting and transferring needle thrust bearings used in the apparatus of Figures 1 and 2; and Figure 4 is an enlarged end sectional view taken along the section line IV—IV of Figure 3.

Referring now to the drawing, and initially to Figures 1 and 2 thereof, there is shown a device for transferring currents to rotary apparatus constructed in accordance with the teachings of the present invention. The reference numeral 10 designates a unitary cast housing member of current conductive material having a rearwardly projecting and vertically extending current conductive arm 12 which is adapted to communicate with one terminal of a source of electrical energy, not shown, as for example the secondary terminal of a welding transformer, whereby current may be supplied to the housing member 10. The housing member 10 is adapted to be attached to and associated with suitable power actuating means, not shown, for effecting vertical movement of the electrode apparatus into and out of welding position as may be required during the normal use thereof. The power actuating means is also operative to apply considerable mechanical force to the electrode for fusing the softened workpieces together as will be understood.

The housing member 10 is of generally hollow rectangular shape thereby defining a front end wall 13, a rear end wall 14, a left sidewall 15 and a right sidewall 16. The sidewalls 15 and 16 are bridged at their upper extremities by a pair of spaced parallel struts 17 and, of course, a suitable top cover means, not shown, would be provided for sealing the housing member from above. A bottom cover plate 18 is attached to the bottom surfaces of the housing member to close the same from below.

Mounted in the front and rear end walls 13 and 14 are the spaced axially aligned bearing assemblies 19 and 20 which will be hereinafter more fully described. The bearing assemblies 19 and 20 serve as journal means for rotatably supporting a current conductive electrode spindle 22 having an even diametered contact portion 23 extending substantially between the bearing assemblies 19 and 20. The electrode spindle 22 is provided adjacent its forward or left hand end with a longitudinally extending throat portion 25 of greater diameter than the contact portion 23 and an enlarged shoulder 26 of greater diameter than the throat portion 25. The electrode spindle 22 is provided near its rear or right hand end with a smaller diametered bearing mounting portion 27, a threaded portion 28 adapted to receive a retaining nut 29 and a yet smaller diametered end portion 30 which is adapted to project through the opening in the rear end wall 14. Secured to the forward end of the electrode spindle 22 by any suitable attachment means, not shown, is a welding electrode wheel 32 which is fabricated from curernt conductive material and which, in accordance with usual practice in the art, is adapted to be rolled relative to workpieces, not shown, during a seam welding or other similar operation.

In accordance with the objects of the invention, high-amperage electric currents are transferred from the current conductive housing member 10 to the electrode spindle 22 and thence to the welding electrode wheel 32 as the latter rolls across the surface of the workpieces, not shown. The bearing assembly 19 in the front end wall 13 of the housing member is of the needle bearing type whose inner race 34 is mounted on the throat portion 25 of the electrode spindle with the forward edge thereof abutting against the enlarged shoulder 26. The outer race 35 of the needle bearing assembly 19 is received within a groove 36 machined in the front end wall 13 of the housing member 10 and, of course, the bearing assembly comprises a plurality of cylindrical needle bearing rollers 37 engaging the opposed faces of the inner and outer races 34 and 35, respectively.

It is preferred that the component parts 34 and 35 of the bearing assembly 19 be fabricated from synthetic sapphire or other like extremely hard non-metallic material. The use of a bearing assembly fabricated from such a material produces several improved results over bearings formed of metallic materials. In the first place, the use of non-metallic material eliminates heating of the bearing assembly since the electrical currents are confined to the electrode spindle 22. When a steel or other current conductive bearing assembly is employed, stray electrical currents produce heating of the same even though expensive and complicated insulated mounting means are used in connection therewith. Secondly, the non-metallic bearing assembly does not affect the electrical circuit in any manner while a bearing assembly formed from other materials has a choking effect on the current passing through the throat portion of the electrode spindle. Thirdly, when synthetic sapphire is employed, the very hard nature thereof provides an excellent bearing surface which is well adapted to withstand sustained and continuous usage for extended periods of time.

It is noted that the inner race 34 extends forwardly of the outer race 35 and that an annular resilient fluid seal 40 is seated in the front end wall 13 to provide a fluid tight seal between the rotating electrode spindle and the stationary housing member. In addition to the above enumerated advantages, the use of synthetic sapphire for the bearing assembly 19 provides an excellent wear-resistant surface for the non-rotating lip of the resilient fluid seal to ride on.

The bearing assembly 20 is of the double roller thrust type whose inner races 41 are mounted on the bearing mounting portion 27 of the electrode spindle 22 and whose outer races 42 are mounted from the housing member 10 in the manner shown. The bearing assembly 20 is provided for absorbing the inward and outward axial thrust of the electrode spindle 22 due to various welding conditions. It will be observed that by suitable adjustment of the retaining nut 29 the electrode spindle 22 may be rigidly restrained by the bearing assemblies 19 and 20 against longitudinal movement with respect to the housing member 10.

Fitted over the projecting end portion 30 of the electrode spindle 22 is a stainless steel sleeve 44 which serves as a wear-resistant bearing surface for the lip of a resilient and annular rear fluid seal 45 mounted in a rear cover cap 46 which in turn is attached to the rear end wall of the housing member 10. The arrangement is such that the fluid seal 45 provides a fluid-tight seal between the rotating electrode spindle 22 and the non-rotating rear end wall 14 of the housing member. The annular and resilient fluid seals 40 and 45 are provided in order that the entire hollow center portion of the housing member may be filled with a lubricant and in this manner all of the mechanism contained therein is completely immersed in the lubricant. The lubricant is introduced into the assembly by being poured from above, the top cover (not shown) being removed. The fluid seals 40 and 45 are positioned forwardly and rearwardly of the bearing assemblies 19 and 20, respectively, so that these assemblies are immersed and run in the bath of lubricant contained in the hollow center portion of the housing member.

It is, of course, necessary to provide means for transferring the high-amperage welding currents from the housing member 10 to the rotary electrode spindle 22 and in accordance with the objects of the invention this is accomplished by current transferring means generally designated by the reference numeral 46. Attached to the side faces of each of the integral struts 17 of the housing member 10 by clamping plates 47 and bolts 48 are the ends of a pair of flexible current conductive members 49 and 50, preferably of laminated construction. The other ends of each pair of the flexible current conductive members 49 and 50 are clamped by the clamping plates 51 and bolts 52 to the upwardly extending outer surface portions 53 of current conductive collector shoes 54 and 55, respectively. As will be observed in Figure 2 of the drawing, both the struts 17 and the outer surface portions 53 of the various current conductive collector shoes 54 and 55 are of considerable transverse dimension in order that the flexible current-conductive members may have a large width dimension and resultant cross sectional area. In this manner of construction the heavy electrical currents may be transferred from the housing member to the plurality of current conductive collector shoes in a highly efficient manner with a minimum of electrical losses. However, it should be understood that the laminated flexible current conductive members are not the only conductor means which may be employed as obviously other such means may be utilized. For example, a series of flexible cables could be used in place of the laminated flexible current-conductive members if desired.

Each of the pair of current-conductive collector shoes 54 and 55 is of identical construction and to avoid unnecessary repetition in the specification only one of these pairs will be described in detail although like reference numberals have been applied to similar portions of these shoes throughout the drawing. The current conductive collector shoe 54 is a ring-like member positioned concentrically about the contacting portion 23 of the electrode spindle 22 and having an upwardly extending projection defining the aforementioned outwardly facing outer surface portion 53 for receiving the lower end of one of the pair of flexible current conductive members 49 or 50. This current conductive shoe is formed with an accurate annular shoulder 57 on the outer face thereof which, as will be hereinafter more fully explained, serves as the stationary race for a plurality of very small needle thrust bearing rollers. The inner face of this current conductive member is machined to provide a plurality of circumferentially spaced bores or recesses 58 as shown in Figure 2 of the drawing.

The current conductive collector shoe 55 is of exactly the same construction and shape as the current conductive collector shoe 54 but these two shoes are positioned back-to-back in co-axial relation with respect to the electrode spindle 22. Thus, the bores or recesses 58 of each of these members are aligned and cooperate to form spring mounting recesses while the annular flanges forming stationary outer races 57 project outwardly in opposite directions. Received within each of the spring mounting recesses defined by the pairs of aligned bores 58 in the current conductive collector shoes 54 and 55 is a compression spring 59 and these plurality of compression springs tend to force the current conductive collector shoes outwardly of each other. As mentioned above, two identical pairs of current conductive collector shoes are provided in encircling and axially spaced relation with respect to the current conductive electrode spindle 22.

Mounted on the contacting portion 23 of the electrode spindle 22 and adapted for rotation therewith are a plurality of current carrying members 61—63 which are held in assembled relation on the electrode spindle 22 by an adjustable clamping nut 64 threadably received on the rear end of the contacting portion of the electrode spindle. The forward-most of said current carrying members 61 is a ring-like member which is abutted against the shoulder defined by the throat portion 25 of the electrode spindle and has a rearwardly projecting annular shoulder 65 on the rear face thereof forming a rotating race for a plurality of very small needle thrust bearing rollers. The current carrying member 62 is a cylindrical sleeve-like element having a radially extending enlargement intermediate its axial length which is machined on its oppositely facing ends to define rotating races 66 for a plurality of very small needle bearing rollers. The third current carrying member 63 is similar to the current carrying member 61 with the exception that the stationary bearing race 67 provided thereby faces rearwardly.

As will be observed from inspection of Figure 1 of the drawing, the pairs of current conductive collecting shoes 49 and 50 and the current carrying members 61—63 are so constructed and so mounted in nesting relation that the stationary races 57 on the current conducting collecting shoes 49 and 50 are disposed is spaced axially aligned relation with respect to the stationary races 65—67 provided by the current carrying members 61—63. The structure is such that four sets of facing cooperating bearing races are provided with each set of bearing races comprising a stationary race 57 provided by one of the current conductive collector shoes 49 or 50 and a rotating race provided by one of the current carrying members 61—63.

Received between each of these sets of cooperating bearing races are a plurality of circumferentially spaced very small needle bearing rollers 69 which are made from a hard current conductive material, such as a copper base bearing alloy, for example. These bearing rollers are of relatively short length as compared with their diameter dimension and even though there will be a slight difference in the peripheral speed of the outer surfaces and the inner surfaces of the needle bearing rollers due to the difference in radii from the center of the electrode spindle to these two surfaces tests have shown that this slight difference in peripheral speed does not adversely affect the operation of the plurality of very small needle bearing rollers. Since the individual needle bearing rollers are very small it is possible to provide a very large number thereof for each set of cooperating bearing races. For example, if the diameter of the bearing races is three inches it is possible to provide approximately eighty individual needle bearing rollers for each set of cooperating bearing races. The use of a large number of very small needle bearing rollers is particularly important in that large composite contact areas are provided for transferring the high-amperage electric welding currents from the stationary races to the rotating races and the electrode spindle 22. Also, the great number of small needle bearing rollers provides an excellent means for anti-frictionally transferring the current whereby the welding electrode wheel 32 and the electrode spindle 22 are adapted for friction free rotation.

In accordance with usual practice, the individual needle bearing rollers associated with each set of cooperating stationary and rotating races are housed in a suitable cage 70 as shown in Figures 3 and 4 of the drawing. The cages retain the individual needle bearing rollers in spaced circumferential relation and are preferably assembled from ring-like pieces of stamped metal. If desired, the cages 70 may be made from non-magnetic and non-current conducting material so that the same have no effect on the transfer of current across the needle bearing rollers.

Considering now the operation of the apparatus above described, it is apparent that the welding electrode wheel and the electrode spindle are adapted for friction-free rotation across the surface of workpieces. Welding current is supplied to the housing member 10 and then conducted via the four flexible current conductive members 49 and 50 to the two pairs of current conductive collecting shoes 54 and 55. The current then flows from the stationary races of the current conductive collecting shoes 54 and 55 across the very large number of indivdual small needle bearing rollers to the rotating races formed on the current carrying members 61—63 and then to the electrode spindle 22 and welding electrode wheel 32. The welding operation is completed in accordance with principles well known in the art to join the workpieces.

The current transferring means 46 is ideally suited for the use intended. By providing a plurality of sets of cooperating bearing races and a very large number of small needle bearing rollers relatively large effective contact areas are afforded so that the current density across any given individual needle bearing roller is kept within acceptable limits. The plurality of circumferentially spaced compression springs 59 apply expansive forces to the sets of current conductive collector shoes 49 and 50 thereby forcing the sets of cooperating bearing races and needle bearing rollers into tight uniform pressure contact about their entire circular contacting surfaces. This arrangement, which is characterized by its utmost simplicity in construction, eliminates any possibility of arcing across the needle bearing rollers and the pitting and deterioration of the component parts associated therewith. The use of a plurality of circumferentially spaced compression springs makes the current-transferring means self-adjusting in that the needle bearing rollers and races are always held in tight pressure contact even though the races may be subject to uneven wear about their peripheries. This allows substantially increased periods of maintenance-free operation. In addition, it will be noted that the current-transferring means comprises a plurality of extremely simple individual component parts that may be easily removed for inspection and/or replacement in a minimum of time and with a minimum of effort. If, for example, the race 65 on the current-carrying member 61 becomes worn the current-carrying member 61 can be removed and replaced without replacement of the other current-carrying members, the electrode spindle or the current-conductive collecting shoes. This is obviously much cheaper than replacing the electrode spindle as must be done in most prior art apparatus of a comparable nature.

In the illustrated embodiment of the invention the current-transferring means 46 comprises a pair of identical individual transfer assemblies each comprising a pair of current conductive collector shoes, a pair of rotating races and two sets of a plurality of needle bearing rollers 69. It should be observed that the construction is such that more or less of these individual current transfer assemblies can be provided by simply stacking the desired number of the current-carrying members on an electrode spindle and providing the requisite pairs of spring-biased current conductive collecting shoes. In this manner the device for transferring currents to rotary apparatus of the present invention can be easily tailored for any given installation.

As set forth above, the entire hollow center of the housing member is filled with a lubricant, such as castor oil, for example, so that the needle bearing rollers, the races and current conductive collector shoes will be completely immersed in a bath thereof. The lubricant serves to dissipate the heat generated by the passage of the current through the plurality of needle bearing rollers as well as lubricate the component parts and improve electrical contact between these parts. It is preferred that the lubricant be water cooled and this is effected in the present embodiment of the invention by providing a cooling conduit 71 of generally rectangular shape which is soldered or otherwise attached to the bottom cover plate 18 as shown in the drawing. Water is circulated through the cooling conduit 71 and in this manner rapid dissipation of heat from the lubricant is effected. Of course, the electrode spindle and welding electrode wheel can be fitted with coolant conductors, not shown, for cooling the same if desired.

It should be apparent that I have accomplished the objects initially set forth by providing improved apparatus for transferring high-amperage electrical currents to rotary apparatus. Although a preferred representative embodiment of the invention has been disclosed it should be understood that many changes may be made therein without departing from the clear teachings of the present invention. Accordingly, reference should be had to the following appended claims in determining the true scope and spirit of the invention.

I claim:

1. A device for transferring high-amperage electrical currents to rotary apparatus comprising a current conductive housing, a rotary spindle, spaced anti-friction bearing assemblies mounted in said housing and journaling said spindle for rotation, and current transferring means for transferring current from said housing to said spindle; said current transferring means being positioned between said spaced anti-friction bearing assemblies and comprising a pair of spaced annular rotary bearing races encircling said spindle in concentric relation therewith and attached thereto, a pair of annular stationary bearing races encircling said spindle in concentric relation therewith, each of said rotary bearing races being disposed in facing spaced relation with respect to one of said stationary races to define two sets of cooperating stationary and rotary bearing races, a plurality of current conductive bearing rollers received between each of said sets of cooperating stationary and rotary bearing races for conducting the flow of current therebetween, said current transferring means comprising a pair of annular current conductive collecting members disposed in concentric encircling relation with respect to said spindle, said current conductive collecting members having portions thereof defining said pair of annular stationary bearing races, said pair of current conductive collecting members being mounted in back-to-back relation, and resilient means disposed between said current conductive collecting members for urging said sets of cooperating stationary and annular bearing races and said current conductive bearing rollers into tight frictional contact.

2. Apparatus according to claim 1 further characterized in that each of said current conductive collecting members has a plurality of circumferentially spaced recesses in the face thereof adjacent the other of said current conductive collecting members, said recesses in said current conductive collecting members being aligned to define spring mounting recesses, and a plurality of compression springs forming said resilient means being received within said spring mounting recesses.

3. Apparatus according to claim 1 further characterized by means for connecting said pair of current conductive collecting members with said housing member, said last mentioned means comprising a pair of flexible current conductive members of appreciable cross sectional area having one set of ends thereof attached to said housing, said pair of current conductive collecting members having projections defining surface portions of appreciable area, and the other set of ends of said flexible current conductive members being secured to said surface portions of said pair of current conductive collecting members.

4. A device for transferring high-amperage electrical currents to rotary apparatus comprising a current conductive housing having spaced front and rear end walls, a current conductive spindle extending outwardly through said front wall and being journaled in said rear wall by means of a combined radial and thrust anti-friction bearing whereby said spindle is restrained against movement along its axis relative to said housing, an anti-friction needle bearing journaling said spindle in said front end wall and having non-magnetic inner and outer bearing races, and means engaging said spindle intermediate its journaling bearing assemblies to conduct electrical current from said housing into said spindle, the arrangement being such that in the use of said device electrical current is caused to flow axially along said spindle through said non-magnetic bearing races.

5. A device according to claim 4 further characterized in that said means engaging said spindle comprises a current conductive shoulder mounted on and rotatable with said spindle and being electrically connected thereto, a ring-like current-conductive member having an annular end surface facing said shoulder, a ring-like bearing cage interposed between said shoulder and said end surface and mounting a large number of radially disposed but circumferentially spaced rollers, means yieldingly engaging said ring-like member at a multiplicity of circumferentially spaced points to uniformly pressure-load said rollers about the whole of the circumferential extent of said shoulder and end surface, said rollers being formed of a copper-based alloy for the efficient conduction of electrical current between said shoulder and said ring-like member.

6. Apparatus according to claim 5 further including sealing means outwardly of the bearing assemblies which journals said spindle, said sealing means cooperating with said housing to provide an oil sump whereby all the bearings and rollers may be continuously emersed in a lubricant.

7. A device for transferring high-amperage electrical currents to a current conductive spindle which is journaled for rotation about its longitudinal axis comprising current conductive means on said spindle to provide an annular longitudinally facing shoulder, a ring-like current conductive member encircling said spindle and having an annular end surface facing said shoulder, a ring-like bearing cage interposed between said shoulder and said end surface and mounting a large number of radially extending but circumferentially spaced rollers each having engagement with both said shoulder and said end surface, yieldable means engaging said conductive ring-like member at a multiplicity of circumferentially spaced points to provide uniform pressure loading of said rollers throughout the whole of the circumferential extent of said shoulder and end surface, said conductive ring-like member being adapted to be connected to a current conductor, and said rollers being formed of a copper-based alloy for the efficient transmission of electrical currents between said shoulder and said end surface.

References Cited in the file of this patent

UNITED STATES PATENTS

| | | |
|---|---|---|
| 2,414,957 | Larrabure | Jan. 28, 1947 |
| 2,623,188 | LeTourneau et al. | Dec. 23, 1952 |
| 2,636,066 | Sciaky | Apr. 21, 1953 |
| 2,726,371 | Seeloff | Dec. 6, 1955 |
| 2,790,152 | Mohr | Apr. 23, 1957 |